Patented Apr. 22, 1941

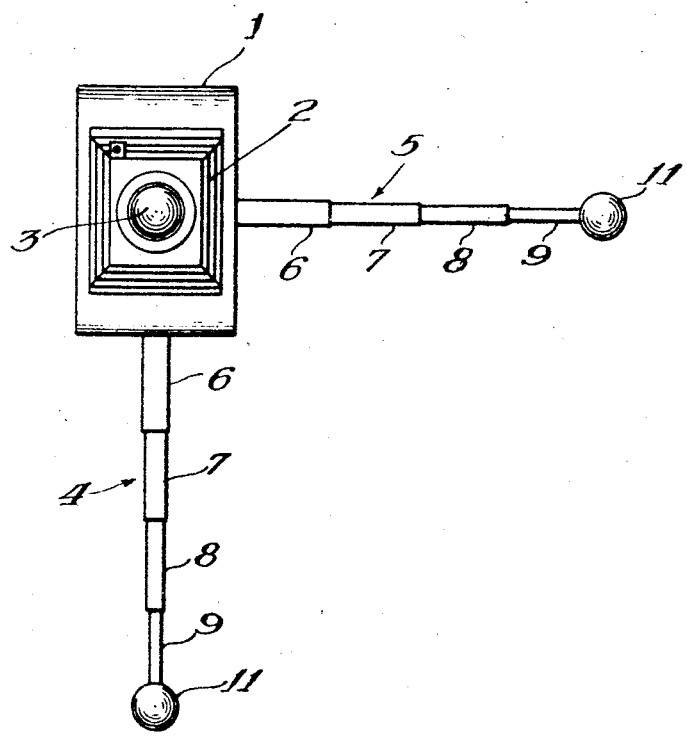
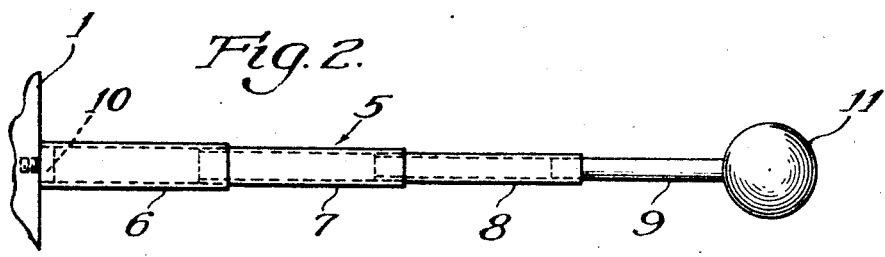
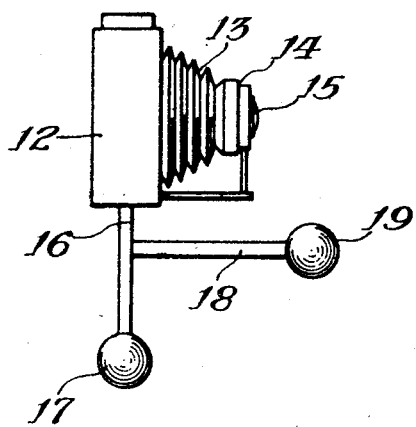

2,239,201

UNITED STATES PATENT OFFICE 2,239,201

STABILIZER FOR HAND CAMERAS

Robert F. Pyzel, Chicago, Ill.

Application October 10, 1938, Serial No. 234,185

3 Claims. (Cl. 248—1)

This invention relates to improvements in a stabilizing device and refers specifically to an inertia stabilizer for hand cameras.

It is a well known precept in photographic work that a good picture can seldom be taken at a shutter speed slower than one-twenty-fifth of a second unless the camera is supported by a tripod or its equivalent. For the hand camera operator or amateur "movie" photographer the subject of the picture and the environment of the subject is frequently such that the use of a tripod or its equivalent is impractical or at least very inconvenient. Lighting conditions or the necessity for focal depth frequently require slow shutter speeds with the accompanying danger of jarring or moving the camera during the picture taking operation.

To hold a camera in the hands with reasonable immobility for slow shutter speed work is very difficult due to the heart beat, nervous reflexes and the necessity for performing a manual operation, i. e., operating the shutter. In movie work the shutter movement sets up periodic motions which cannot be manually successfully resisted.

The geometrical relationship between the camera plate or focal plane, the lens and the subject is such that motion of the camera parallel to the focal plane, e. g., sidewise or up and down movement, plays little part in blurring the image on the plate. However, movement of the camera about a line which lies in or is parallel to the focal plane thereof, e. g., a turning motion, produces excessive blurring and distortion.

It is an object of my invention, therefore, to stabilize a hand camera against movement about a line in or parallel to the focal plane, that is, against horizontal and vertical canting movements about such a line. To accomplish this object, I provide two rods, each of which is secured to the camera; one to the bottom thereof which projects vertically downwardly and the other to one side of the camera which projects at right angles to the first mentioned rod. Preferably each of said rods carries a weight at its projecting end whereby the angular inertia of the camera as a whole is increased particularly with respect to movement about a line contained in or parallel to its focal plane. I may, however, also use a modification which still employs the same principle, by attaching one rod to the camera, and attaching the second rod to the first at approximately a right angle, in order to simplify the connection to the camera.

Other objects and advantages of my invention will be apparent from the accompanying drawing and following detailed description.

In the drawing,

Fig. 1 is a face view of a camera having the stabilizing members comprising my invention attached thereto.

Fig. 2 is a detailed view of one of the stabilizing rods.

Fig. 3 is a side elevational view of a camera showing a slight modification of my invention.

Referring in detail to the drawing, 1 indicates a body of a conventional folding camera having bellows 2 and lens 3. Although a conventional folding camera is illustrated, my invention may be utilized with substantially any type of hand camera, such as, a box camera, portable "movie" camera, or any of the usual types of miniature cameras.

A telescopic rod 4 is secured at one end to the lower portion of the body 1 and another similar rod 5 is secured to one side of the body. The rod 5 may be secured to either side of the camera body or such rods may be secured to both sides. In most instances, however, one rod 5 is sufficient and it is preferably secured to the right side of the camera, as shown, so that the operator's right hand may be unimpeded in manipulating the shutter.

The rods 4 and 5 are of the telescopic type, each being made up of sections 6, 7, 8 and 9 of progressively decreasing diameter whereby the entire rod may be telescoped within the compass of the section 6. Each section 6 may be provided with a screw 10 which is adapted to threadedly engage a bushing usually provided in the camera body for a tripod.

If desired, the rods 4 and 5 may collapse within the camera body itself whereby the same may be conveniently projected outwardly when occasion demands.

A weight 11 is carried at the end of each section 9 which may be either permanently or removably secured to said section. Preferably the weight of the rod is relatively small with respect to the weight of the weight 11 per se so that the center of gravity of the weight and rod, considered as a unit, is as far from the camera body as reasonably possible. The desirability of this relationship can be appreciated from the fact that the moment of inertia of the assemblage about an axis through the center of the camera, at right angles to a given rod, varies with the weight of the rod and weight 11 and with the square of the distance between the axis and the center of gravity of the rod and weight 11. Consequently in order to secure the greatest inertia effect for a predetermined minimum overall weight the center of gravity of the rod and weight 11 should be as close to the end of the rod as possible.

Of course, it is to be understood that relatively light weight one-piece rods (not shown) or other suitable arrangements may be used instead of the telescopic rods 4 and 5. The rods may be carried separately by the operator and attached to the camera body when occasion demands, or may be hinged to the camera, folding away when not in use.

Although the form of my invention hereinbefore described appears to present the most convenient practical aspect thereof, in its broadest form the relationship of a distantly, rigidly carried weight to inertia about a predetermined axis or axes in conjunction with a hand camera or the like constitutes the invention.

Since the angular motion to be restrained is particularly motion in a plane containing the line (object to image), a weight carried on this line rigidly secured to and at a distance from the camera would produce the desired stabilization. However, if secured in front of the camera, it would appear "in the picture;" if in the rear, it would interfere with the operator. One weighted arm, however, could be conveniently used by attaching the same to the front of the camera and projecting the same forwardly at such an angle as to be just outside the field of view of the lens. This arrangement is not illustrated in the drawing but could be readily constructed by anyone skilled in the art. Obviously, the angle of projection of the arm would vary with the angle of view of the lens.

Referring in detail to Fig. 3, a slight modification of my invention is shown as attached to a conventional hand camera having a body 12, bellows 13, lens-board 14 and lens 15. In this form of my invention a rod 16 is suitably secured to the bottom of the camera body 1, preferably by screwing the rod into the usual tripod bushing. If desired, the rod 16 may be of telescopic construction similar to rods 4 and 5 or same may be non-collapsible. A weight 17 is carried at the end of the rod 16. A second rod 18 is secured to weight an intermediate portion of rod 16 and projects substantially at right angles to rod 16. A weight 19 is carried at the end of rod 18. The arrangement is such as to increase the inertia of movement of the camera about a line lying in or parallel to the focal plane of the camera. In use the rod 18 may project forwardly, as shown, or if desired said rod may project outwardly from either side of the camera, merely by turning rod 16 in the camera bushing.

I claim as my invention:

1. In combination, a hand camera comprising a body having a top, bottom and sides, and adapted to contain a film at the focal plane of the camera, arms rigidly connected to the bottom and side of the camera body, said arms lying substantially in the focal plane of the camera and having their respective centers of gravity remote from the camera body to increase the angular inertia of the body about a line contained in or parallel to its focal plane.

2. In combination, a hand camera comprising a body having a top, bottom and sides, and adapted to contain a film at the focal plane of the camera, extensible arms rigidly connected to the bottom and side of the camera body, said arms when extended having their respective centers of gravity remote from the camera body to increase the angular inertia of the body about a line contained in or parallel to its focal plane the centers of gravity of said arms lying substantially in the focal plane of the camera.

3. In combination, a hand camera comprising a body having a top, bottom and sides, and adapted to contain a film at the focal plane of the camera, an arm rigidly secured to the camera body and lying substantially in the focal plane of the camera, said arm having its center of gravity remote from the camera body and a second arm associated with the camera disposed at substantially a right angle to said first mentioned arm.

ROBERT F. PYZEL.